United States Patent
Kim et al.

(10) Patent No.: US 9,374,012 B2
(45) Date of Patent: Jun. 21, 2016

(54) POWER SUPPLY

(71) Applicant: SAMSUNG ELECTRO-MECHANICS CO., LTD., Suwon, Gyunggi-do (KR)

(72) Inventors: Jae Kook Kim, Gyunggi-do (KR); Chong Eun Kim, Gyunggi-do (KR); Sung Ho Kim, Gyunggi-do (KR); Dong Kyun Ryu, Gyunggi-do (KR)

(73) Assignee: SAMSUNG ELECTRO-MECHANICS CO., LTD., Suwon, Gyunggi-do (KR)

( * ) Notice: Subject to any disclaimer, the term of this patent is extended or adjusted under 35 U.S.C. 154(b) by 176 days.

(21) Appl. No.: 13/946,890

(22) Filed: Jul. 19, 2013

(65) Prior Publication Data

US 2014/0177283 A1 Jun. 26, 2014

(30) Foreign Application Priority Data

Dec. 21, 2012 (KR) .................. 10-2012-0151302

(51) Int. Cl.
*H02M 3/335* (2006.01)
*H02M 1/00* (2006.01)

(52) U.S. Cl.
CPC .... *H02M 3/33576* (2013.01); *H02M 2001/007* (2013.01); *H02M 2001/0058* (2013.01); *H02M 2001/0096* (2013.01); *Y02B 70/1491* (2013.01)

(58) Field of Classification Search
CPC ........... H02M 1/12; H02M 1/32; H02M 3/28; H02M 3/3376; H02M 7/537; H02M 7/5387
USPC .................... 363/15, 17, 37, 39, 50, 131, 132
See application file for complete search history.

(56) References Cited

U.S. PATENT DOCUMENTS

| 5,929,690 | A | 7/1999 | Williams |
| 6,504,497 | B2 | 1/2003 | Jang et al. |
| 7,667,986 | B2 * | 2/2010 | Artusi et al. ................. 363/16 |
| 8,395,913 | B2 * | 3/2013 | Torrico-Bascope ............ 363/47 |
| 8,872,499 | B2 * | 10/2014 | Kim et al. ...................... 323/299 |
| 2001/0030879 | A1 * | 10/2001 | Greenfeld et al. .............. 363/17 |
| 2004/0032239 | A1 * | 2/2004 | Steigerwald et al. ......... 323/274 |
| 2005/0180173 | A1 * | 8/2005 | Batarseh et al. ............... 363/15 |
| 2005/0265056 | A1 * | 12/2005 | Yan et al. ....................... 363/127 |
| 2008/0055944 | A1 * | 3/2008 | Wang ............... H02M 3/33592 363/21.06 |

(Continued)

FOREIGN PATENT DOCUMENTS

| CN | 1352482 A | 6/2002 |
| CN | 101420175 A | 4/2009 |

(Continued)

OTHER PUBLICATIONS

Office Action issued on Dec. 12, 2013 in the corresponding Korean patent application No. 10-2012-0151302.

(Continued)

*Primary Examiner* — Adolf Berhane
(74) *Attorney, Agent, or Firm* — McDermott Will & Emery LLP (57) ABSTRACT

There is provided a power supply including a direct current (DC) to DC converter supplying main power to a load, and a sub converter connected to the DC to DC converter and reducing output loss, wherein the sub converter is operable based on a hold-up time.

10 Claims, 10 Drawing Sheets

(56) References Cited

U.S. PATENT DOCUMENTS

| | | |
|---|---|---|
| 2009/0097286 A1 | 4/2009 | Lin et al. |
| 2010/0002471 A1 | 1/2010 | Heo et al. |
| 2010/0237701 A1* | 9/2010 | Yeh .................. H02J 9/061 307/66 |
| 2010/0246220 A1* | 9/2010 | Irving ............... H02M 1/4225 363/78 |
| 2011/0051476 A1* | 3/2011 | Manor ................. H02M 1/14 363/65 |
| 2011/0103097 A1 | 5/2011 | Wang et al. |
| 2011/0164339 A1* | 7/2011 | Schmid .............. H02M 1/4208 361/18 |
| 2013/0033904 A1* | 2/2013 | Ye ............................ 363/17 |
| 2013/0201729 A1* | 8/2013 | Ahsanuzzaman . H02M 3/33507 363/21.12 |

FOREIGN PATENT DOCUMENTS

| | | |
|---|---|---|
| CN | 102118106 A | 7/2011 |
| KR | 2010-0004620 A | 1/2010 |
| KR | 2011-0064605 A | 6/2011 |

OTHER PUBLICATIONS

SIPO (China). Oct. 23, 2015. The First Office Action for Application No. 201310320171.8, entitled "Power Supply," Samsung Electro-Mechanics Co., Ltd. (Chinese counterpart to instant application).

* cited by examiner

POWER SUPPLY

CROSS-REFERENCE TO RELATED APPLICATIONS

This application claims the priority of Korean Patent Application No. 10-2012-0151302 filed on Dec. 21, 2012, in the Korean Intellectual Property Office, the disclosure of which is incorporated herein by reference.

BACKGROUND OF THE INVENTION

1. Field of the Invention

The present invention relates to a power supply operable during a hold-up time and thus capable of reducing output loss.

2. Description of the Related Art

In general, a phase shifted full bridge (PSFB) converter is widely used as a direct current (DC) to DC converter in a power supply. This is due to the fact that such a PSFB converter places less stress on a semiconductor device and allows zero voltage switching, and is thus suitable for high capacity applications.

The DC to DC converter needs to meet hold-up time requirements. That is, since a load is to be powered for a certain period of time, even if an input alternating current power supply is interrupted due to failure, the DC to DC converter supplies power from the direct current link voltage charged in a capacitor in the input terminal of the power supply. However, the direct current link voltage is reduced over time, and thus a duty ratio is required to be increased in order to supply a constant amount of power to the load by taking the reduction in the direct current link voltage into consideration.

Accordingly, the DC to DC converter needs to be designed to accept a wider range of input voltage levels, and consequently it has a small duty ratio in a normal state (i.e., a nominal state).

Therefore, the PSFB has the problem in that efficiency in supplying power is lowered.

Patent Document 1, referenced below, relates to a PSFB, but does not teach operating during a hold-up time to reduce loss.

RELATED ART DOCUMENT (Patent Document 1) Korean Patent Laid-Open Publication No. 2011-0064605

SUMMARY OF THE INVENTION

An aspect of the present invention provides a power supply capable of increasing efficiency.

According to an aspect of the present invention, there is provided a power supply, including: a direct current (DC) to DC converter supplying main power to a load; and a sub converter connected to the DC to DC converter and reducing output loss, wherein the sub converter is operable based on a hold-up time.

The DC to DC converter may include: a primary circuit including a primary winding of a transformer; and a secondary circuit including a second winding magnetically coupled to the primary winding of the transformer.

The primary circuit of the DC to DC converter may include a switching module in which two terminals, one terminal of a first switching element and one terminal of a second switching element connected in series, are connected to both terminals of a voltage source, and two terminals, one terminal of a third switching element and one terminal of a fourth switching element connected in series, are connected to the both terminals of the voltage source in parallel, wherein the primary winding of the transformer is connected between a first node and a second node, wherein the first switching element and the second switching element are connected at the first node, and the third switching element and the fourth switching element are connected at the second node.

The secondary circuit of the DC to DC converter may include a switching element connected to the secondary winding of the transformer in series, and controlling current flowing in the secondary winding of the transformer.

The sub converter may include: an inductor element connected to the secondary circuit; a first sub switching element providing a path for energy to be stored in the inductor element; and a second sub switching element providing a path for delivering energy stored in the inductor element.

The first sub switching element may be turned on when the third switching element is turned on, and may be turned off while the third switching element remains turned on.

The second sub switching element may be turned on after a predetermined period of time from when the first sub switching element is turned off, and may be turned off when the third switching element is turned off.

The first sub switching element may be turned on when the fourth switching element is turned on, and may be turned off while the fourth switching element remains turned on.

The second sub switching element may be turned on after a predetermined period of time from when the first sub switching element is turned off, and may be turned off when the fourth switching element is turned off.

According to another aspect of the present invention, there is provided a power supply, including: a DC to DC converter supplying main power through a primary circuit connected to terminals of a voltage source and a secondary circuit magnetically coupled to the primary circuit; and a sub converter storing energy supplied from the secondary circuit and providing a path for delivering the stored energy.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. The embodiments of the present invention may be modified in many different forms and the scope of the invention should not be limited to the embodiments set forth herein. Rather, these embodiments are set forth to provide thorough and complete understanding of the present invention, and will fully convey the concept of the invention to those skilled in the art. In the accompanying drawings, shapes and dimensions of elements may be exaggerated for clarity.

Figure 1:
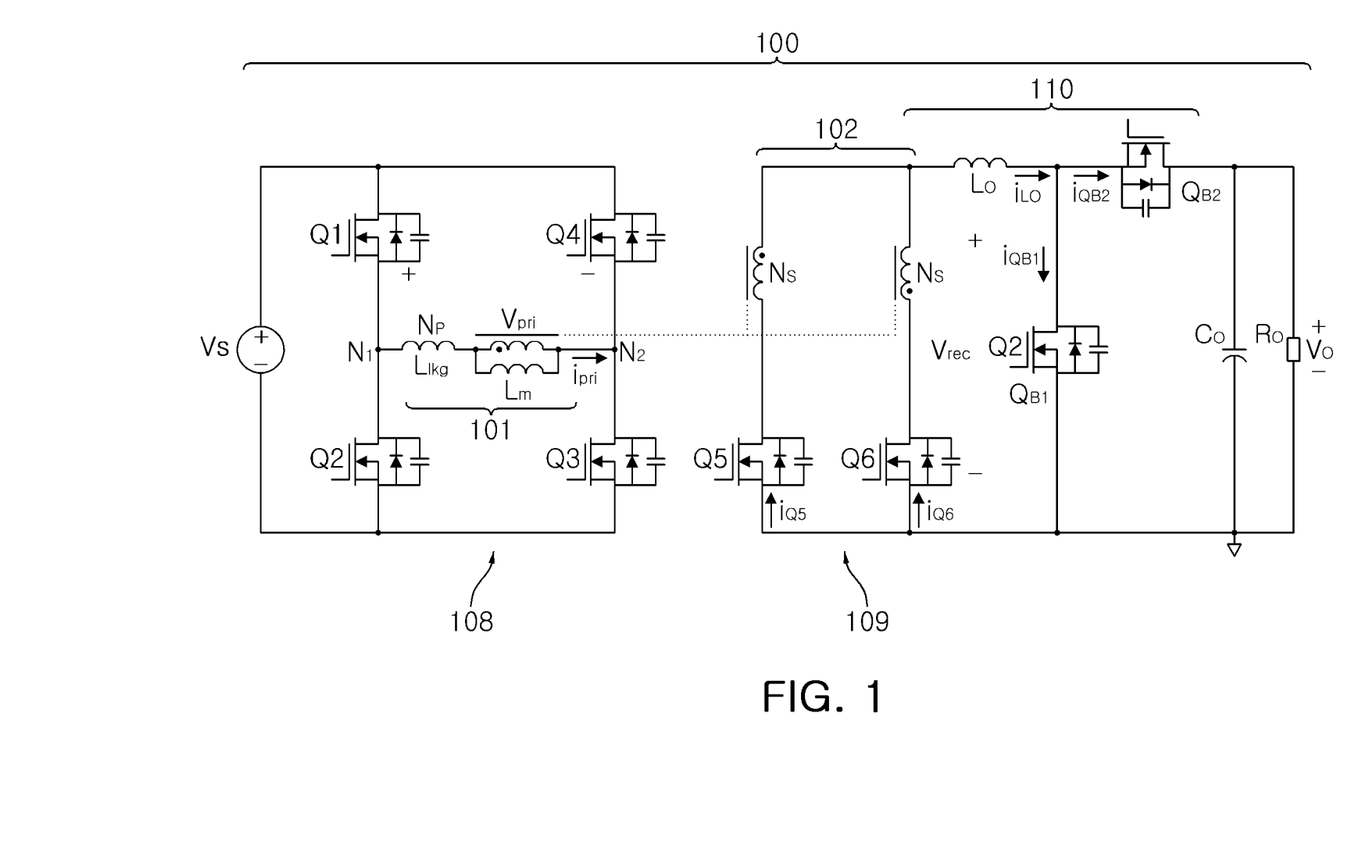
FIG. 1 is a circuit diagram of a power converter according to an embodiment of the present invention.

FIG. 1 is a circuit diagram of a power converter according to one embodiment of the present invention.

Figure 2:
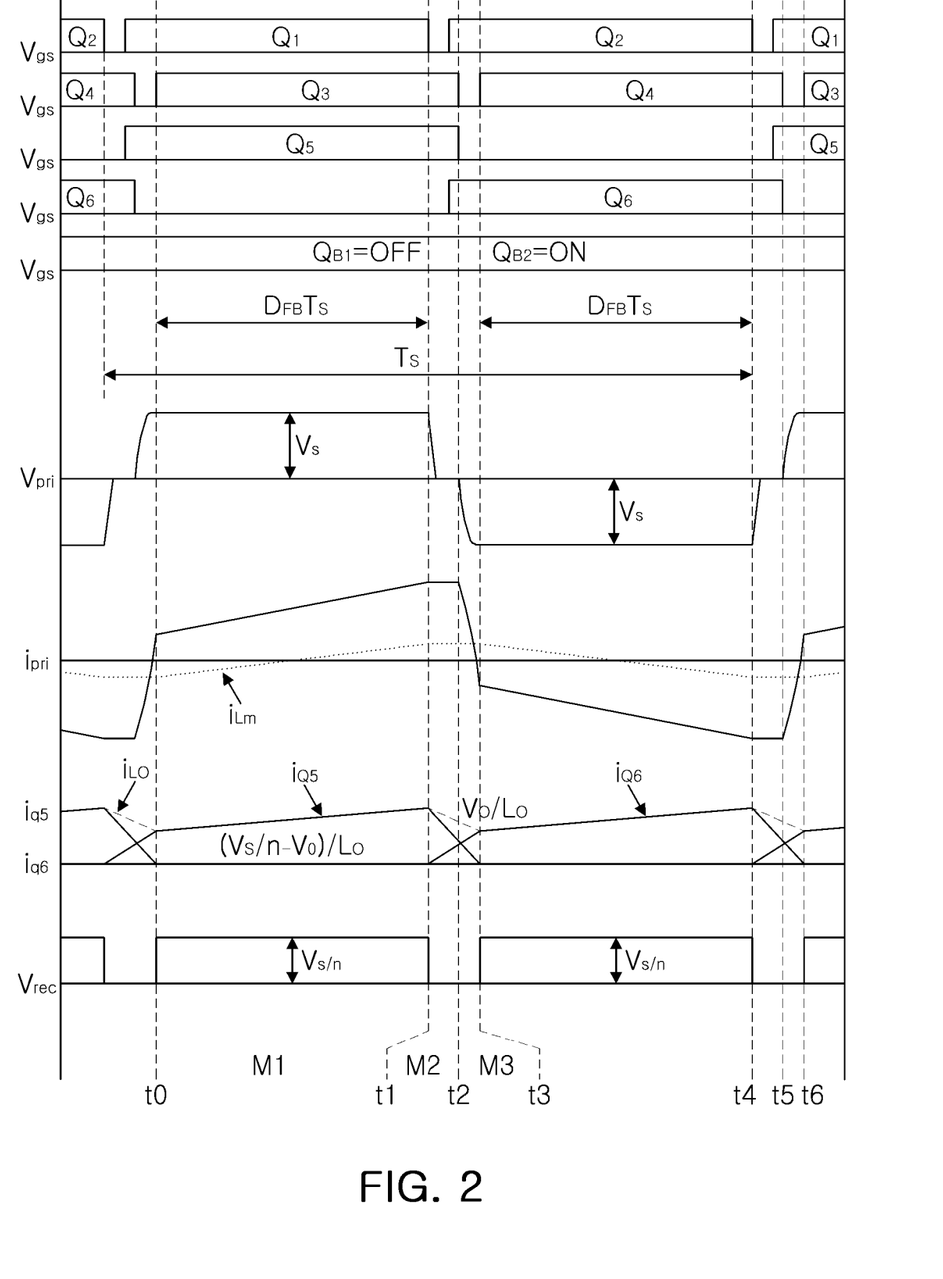
FIG. 2 is a graph illustrating operational wave forms of main components of a circuit in a nominal mode.
Figure 3:
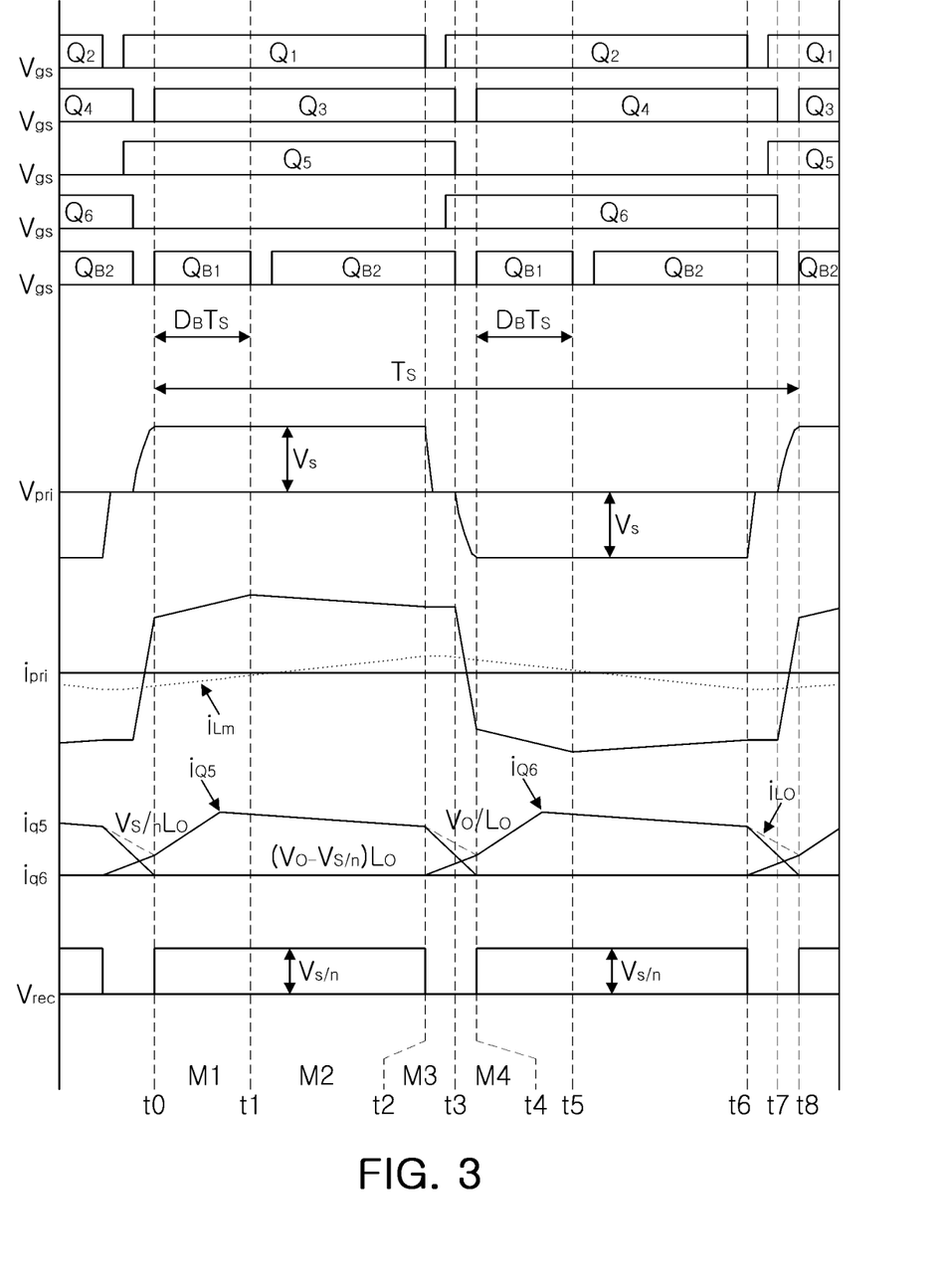
FIG. 3 is a graph illustrating operational wave forms of main components of a circuit in a hold-up mode.

FIGS. 2 and 3 are diagrams showing waveforms of main elements of a power converter according to an embodiment of the present invention.

A power converter according to an embodiment of the present invention may include a main converter 100 supplying main power to a load, and a sub converter 110 reducing power loss of the main power. For example, the main converter 100 may be a phase shifted full bridge direct current (DC) to DC converter supplying the main power to the load.

The sub converter 110 may be integrated into the main converter 100. The sub converter 110 may be operable during a hold-up period in which alternating current (AC) loss occurs, so as to reduce output loss.

Hereinafter, the power converter according to the embodiment of the present invention will be described in detail with reference to FIG. 1.

Referring to FIG. 1, as an example of the main converter 100 according to the embodiment of the present invention, a phase shifted full bridge DC to DC converter (PSFBC) incorporating a sub converter 110 at its output is shown. The phase shifted full-bridge DC to DC converter has high efficiency due low current/voltage stress and zero voltage switching (ZVS), and thus is very advantageous for power applications.

More specifically, the main converter 100 includes: a bridge circuit $Q_1$ to $Q_4$ in which two terminals, one terminal of a first switching element $Q_1$ and one terminal of a second switching element $Q_2$ connected in series, are connected to a voltage source Vs in parallel, and two terminals, one terminal of a third switching element $Q_3$ and one terminal of a fourth switching element $Q_4$ connected in series, are connected to the voltage source Vs in parallel; a transformer 101 and 102 including a primary winding 101 connected between a first node N1, in which the first switching element $Q_1$ and the second switching element $Q_2$ are connected, and a second node N2, in which the third switching element $Q_3$ and the fourth switching element $Q_4$ are connected, and at least one secondary winding 102 magnetically coupled to the primary winding 101; and an inductor element Lo and a capacitor element Co connected to the secondary winding 102 of the transformer 101 and 102.

In addition, the main converter 100 may include switching modules $Q_5$ and $Q_6$ for allowing or interrupting current flows $i_{Q5}$ and $i_{Q6}$ in the secondary winding 102 of the transformer 101 and 102. The sub converter 110 may be disposed between both terminals of the transformer 101 and 102 and both terminals of the capacitor element Co. The sub converter 110 may include the inductor element Lo connected to the secondary winding, a first sub switching element $Q_{B1}$ providing the inductor element Lo with a path for energy to be stored, and a second sub switching element $Q_{B2}$ providing the inductor element Lo with a path for delivering the stored energy. According to the embodiment of the present invention, the sub switching elements allow or interrupt the current flows $i_{QB1}$ and $i_{QB2}$ from the secondary winding 102 of the transformer 101 and 102.

The turns ratio of the transformer 101 and 102 may be Np:Ns=n:1, and the primary winding 101 may be represented by leakage inductance and magnetizing inductance components $L_{lkg}$ and Lm as shown in FIG. 1. Meanwhile, each of the first switching element $Q_1$ to the fourth switching element $Q_4$ may include the respective one of diodes D1 to D4 and the respective one of parasitic capacitors C1 to C4.

The main converter 100 thus configured supplies main power to the load Ro in a nominal mode and a hold-up mode.

In the following, the configuration including at least one of the switching element $Q_1$ to the fourth switching element $Q_4$, and the primary winding 101 of the transformer 101 and 102 of the main converter 100 is referred to as a primary circuit of the main converter 100. Further, the configuration including at least one of the secondary winding 102 of the transformer 101 and 102, the fifth switching element $Q_5$, the sixth switching element $Q_6$, the sub converter 110, and the capacitor element Co is referred to as a secondary circuit of the main converter 100.

A boost converter is shown as an example of the sub converter 110. As shown, the sub converter 110 may include an inductor element Lo, the first sub switching element $Q_{B1}$ and the second sub switching element $Q_{B2}$.

More specifically, the sub converter 110 may be disposed between both terminals of secondary winding 102 of the transformer 101 and 102 and both terminals of the capacitor element Co.

The current flow from the terminals of the secondary winging 102 of the transformer to the load may be adjusted by the sub switching elements $Q_{B1}$ and $Q_{B2}$.

According to an embodiment of the present invention, in a nominal mode, the second sub switching element $Q_{B2}$ may repeatedly be turned on while the first sub switching element $Q_{B1}$ may repeatedly be turned off. Here, the current from the secondary winding 102 of the transformer to the inductor element Lo may flow into the second sub switching element $Q_{B2}$.

According to an embodiment of the present invention, in a hold-up mode, the first sub switching element $Q_{B1}$ and the second sub switching element QB2 may be periodically turned on and turned off. For instance, in the hold-up mode, the first sub switching element QB1 may be turned on when the third switching element $Q_3$ is turned on. Additionally, the first sub switching element QB1 may be turned off while the third switching element QB3 remains turned on. Additionally, the second sub switching element QB2 may be turned on after a predetermined period of time from when the first sub switching element $Q_{B1}$ has been turned off. Additionally, the second sub switching element $Q_{B2}$ may be turned off when the third switching element $Q_{B3}$ is turned off. Moreover, in the hold-up mode, the first sub switching element $Q_{B1}$ may be turned on when the fourth switching element $Q_4$ is turned on. Additionally, the first sub switching element $Q_{B1}$ may be turned off while the fourth switching element $Q_{B4}$ remains turned on. Additionally, the second sub switching element $Q_{B2}$ may be turned on after a predetermined period of time from when the first sub switching element $Q_{B1}$ has been turned off. Additionally, the second sub switching element $Q_{B2}$ may be turned off when the fourth switching element $Q_{B4}$ is turned off.

Hereinafter, an operational principle of a power converter integrating with an auxiliary converter according to an embodiment of the present invention will be described in detail with reference to FIGS. 2 and 5.

FIG. 2 is a graph illustrating operational wave forms of main components of a circuit in a nominal mode.

FIG. 3 is a graph illustrating operational wave forms of main components of a circuit in a hold-up mode.

Figure 4A:
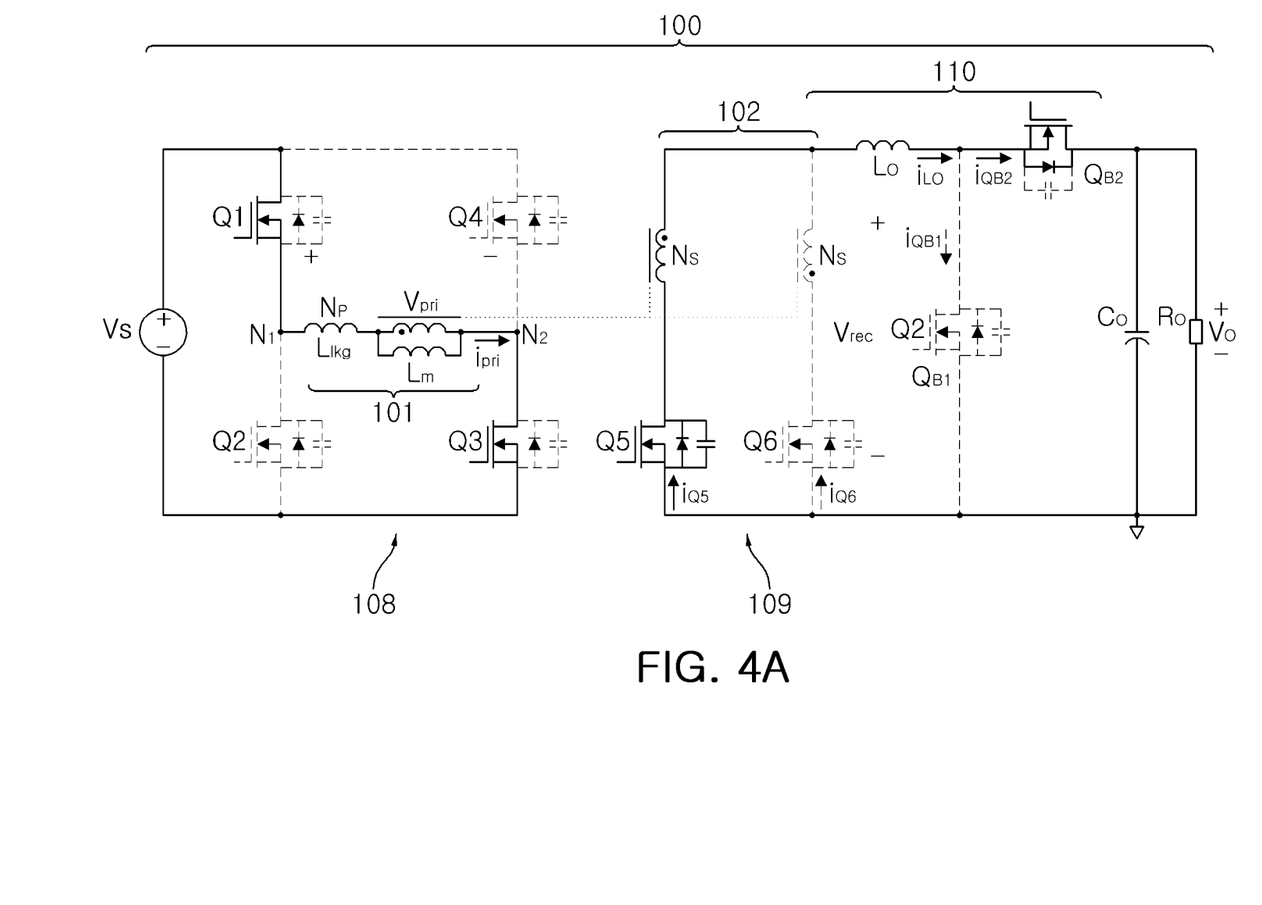
FIGS. 4A to 4C are circuit diagrams illustrating the operation of a circuit in a nominal mode.
Figure 4B:
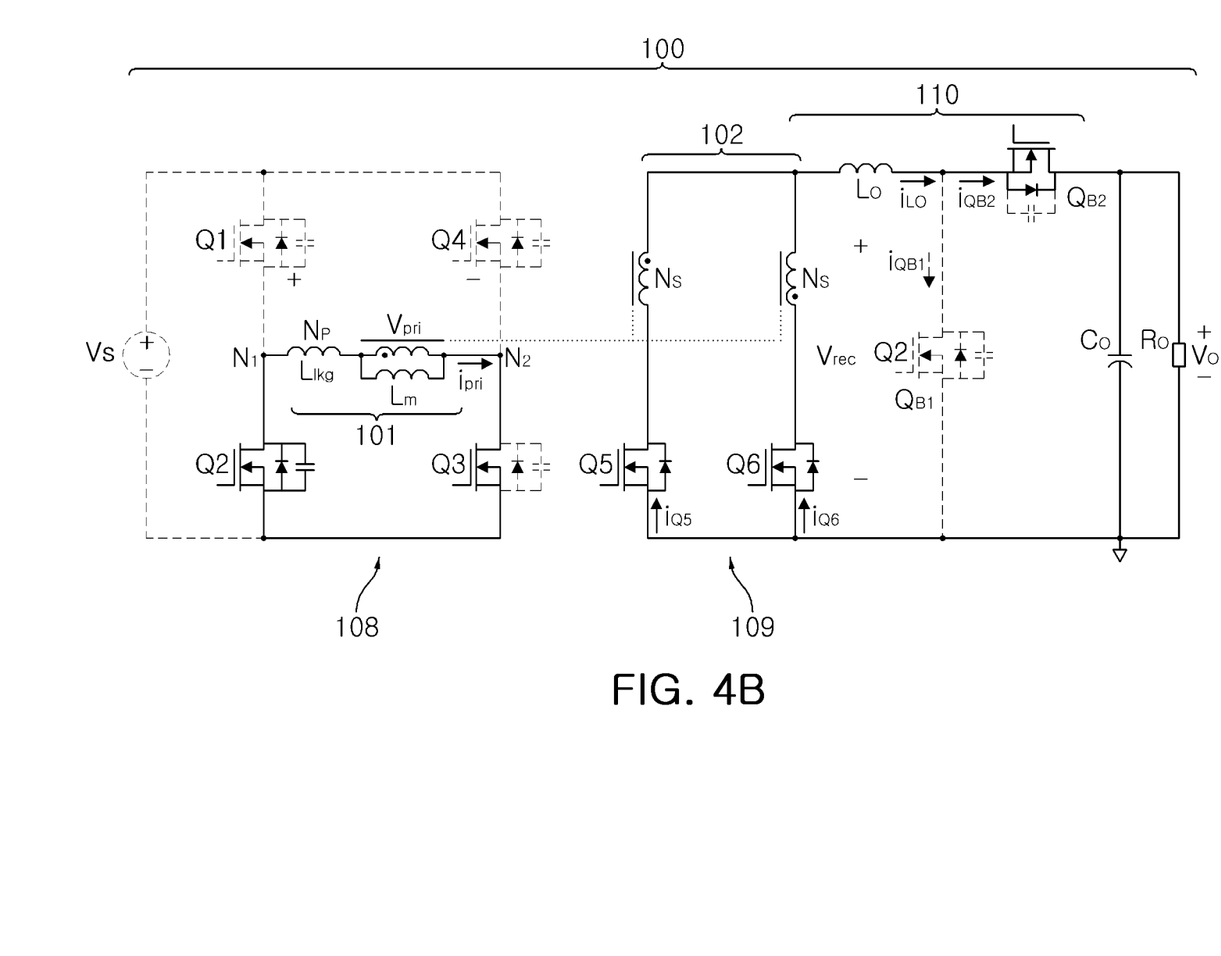

FIGS. 4A to 4B are circuit diagrams illustrating the operation of a circuit in a nominal mode.

FIGS. 5A to 5D are circuit diagrams illustrating the operation of a circuit in a hold-up mode.

In the FIGS. 4A to 4C and 5A to 5D, components not operating are represented by dotted lines.

Referring to FIGS. 2 and 4A to 4C, a nominal mode may be divided into a first period (t0 to t1), a second period (t1 to t2), a third period t2 to t3, a fourth period t3 to t4, a fifth period t4 to t5, and a sixth period t5 to t6. The operational principle of the fourth period t3 to t4 through the sixth period t5 to t6 are same as that of the first period t0 to t1 through the third period t2 to t3; and, therefore, the first period t0 to t1 through the third period t2 to t3 will be mainly described for simplicity and clarity.

1. First Period t0 to t1—$Q_1/Q_3/Q_5/Q_{B2}$: ON, $Q_2/Q_4/Q_6/Q_{B1}$: OFF (see FIG. 4A)

Since the first switching element $Q_1$ and the third switching element $Q_3$ are in the on state, a voltage $V_{pri}$ in the primary winding 101 of the main converter 100 is equal to voltage source Vs. Therefore, a primary current $i_{pri}$ flowing through a path from the first switching element $Q_1$, to the primary winding 101 of the transformer, and to the third switching element $Q_3$ is increased at a constant gradient. Further, since the fifth switching element $Q_5$ is in the on state, a voltage Vrec2 in the secondary winding 102 becomes a voltage of Vs/n according to a turns ratio (n:1), such that a current $i_{Lo}$ flowing into the inductor Lo is increased at a gradient of (Vs/n–Vo)/LO.

Each of parasitic capacitors C2 and C4 of the second switching element $Q_2$ and the fourth switching element $Q_4$ is charged with the voltage of Vs. As described above, in the first period, the main power is powered from the primary circuit of the main converter 100 to the secondary circuit thereof. Other symbols $i_{Q5}$ and $i_{Q6}$ that are not described, respectively, denote a current flowing in the fifth switching element $Q_5$ and a current flowing in the sixth switching element $Q_6$.

2. Second Period t1 to t2—$Q_3/Q_5/Q_{B2}$: ON, $Q_1/Q_4/Q_{B1}$: OFF, $Q_2/Q_6$: Turned on (See FIG. 4B)

During this period, the second switching element $Q_2$ and the sixth switching element $Q_6$ are turned on. After the voltage charged in the parasitic capacitor C2 of the second switching element $Q_2$ in the first period is completely discharged, the second switching element $Q_2$ is turned on, such that the zero voltage switching may be performed for the second switching element $Q_2$.

The voltage $V_{pri}$ in the primary winding 101 of the main converter 100 is 0V, such that the primary current $i_{pri}$ flows through a path from the second switching element $Q_2$, to the primary winding 101 of the transformer, and to the third switching element $Q_3$. Since the voltage $V_{pri}$ in the primary wiring 101 of the main converter 100 is 0V, the voltage Vrec in the secondary winding 102 is also 0V.

Here, the current $i_{Lo}$ flowing into the inductor Lo of the main converter 100 flows through the fifth switching element $Q_5$ and the sixth switching element $Q_6$. Here, a gradient of the current $i_{Lo}$ is Vo/Lo.

3. Third Period t2 to t3—$Q_2/Q_6/Q_{B2}$: ON, $Q_1/Q_4/Q_{B1}$: OFF, $Q_3/Q_5$: Turned Off (See FIG. 4C)

Figure 4C:
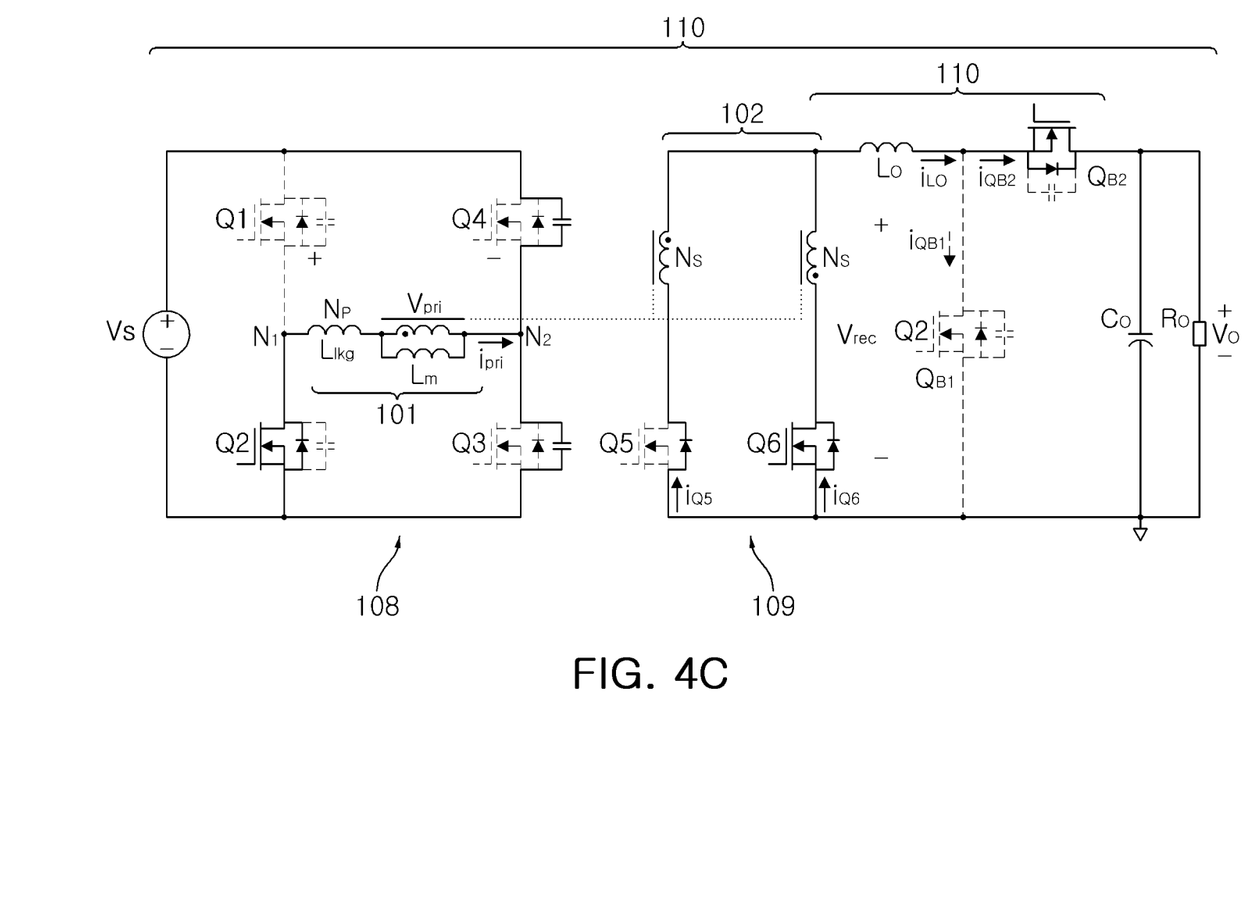

In this period, the third switching element $Q_3$ and the fifth switching element $Q_5$ are turned off. Since the third switching element $Q_3$ is turned off, the voltage charged in the fourth switching element $Q_4$ is completely discharged through a path from the voltage source Vs, to the second switching element $Q_2$, and to the primary winding 101 of the transformer, and the voltage $V_{pri}$ in the primary wiring 101 of the main converter 100 decreases from 0V to –Vs. As the voltage in the primary winding 101 of the transformer decreases from 0V to –Vs, the primary current $i_{pri}$ flowing in the primary winding 101 of the transformer is also reduced accordingly. In addition, when the fifth switching element $Q_5$ is turned off, the current, which was flowing through the channel of the fifth switching element $Q_5$, flows through the diode D5.

The sum of the current $i_{Q5}$ flowing through the diode D5 of the fifth switching element $Q_5$ and the current $i_{Q6}$ flowing through the body of the sixth switching element $Q_6$ is equal to the current $i_{Lo}$ flowing in the inductor Lo of the main converter 100. As shown, the voltage Vrec in the second winding 102 of the main converter 100 is 0V.

In FIG. 2, the symbol Ts denotes a period of time of one switching cycle. A DC conversion ratio of the power supply according to the present embodiment in the normal mode, may be expressed by equation 1.

$$\frac{V_O}{V_S} = 2D_{FB} \times \frac{N_S}{N_P} \qquad \text{[Equation 1]}$$

Here, DFB denotes an effective duty ratio of a phase shifted full bridge DC to DC converter, while Vs denotes an input voltage, and Vo denotes an output voltage. Further, Np denotes a turns amount of the primary winding of a transformer, and Ns denotes turns amount of the secondary winding.

Referring to FIGS. 3 and 5, a hold-up mode may be mainly divided into a first period (t0 to t1), a second period (t1 to t2), a third period t2 to t3, a fourth period t3 to t4, a fifth period t4 to t5, a sixth period t5 to t6, a seventh period t6 to t7, and an eighth period t7 to t8. The operational principle of the fifth period t4 to t5 through the eighth period t7 to t8 is the same as that of the first period t0 to t1 through the fourth period t3 to t4; and, therefore, the first period t0 to t1 through the fourth period t3 to t4 will be mainly described.

1. First Period t0 to t1—$Q_1/Q_3/Q_5/Q_{B1}$: ON, $Q_2/Q_4/Q_6/Q_{B2}$: OFF (see FIG. 5A)

Figure 5A:
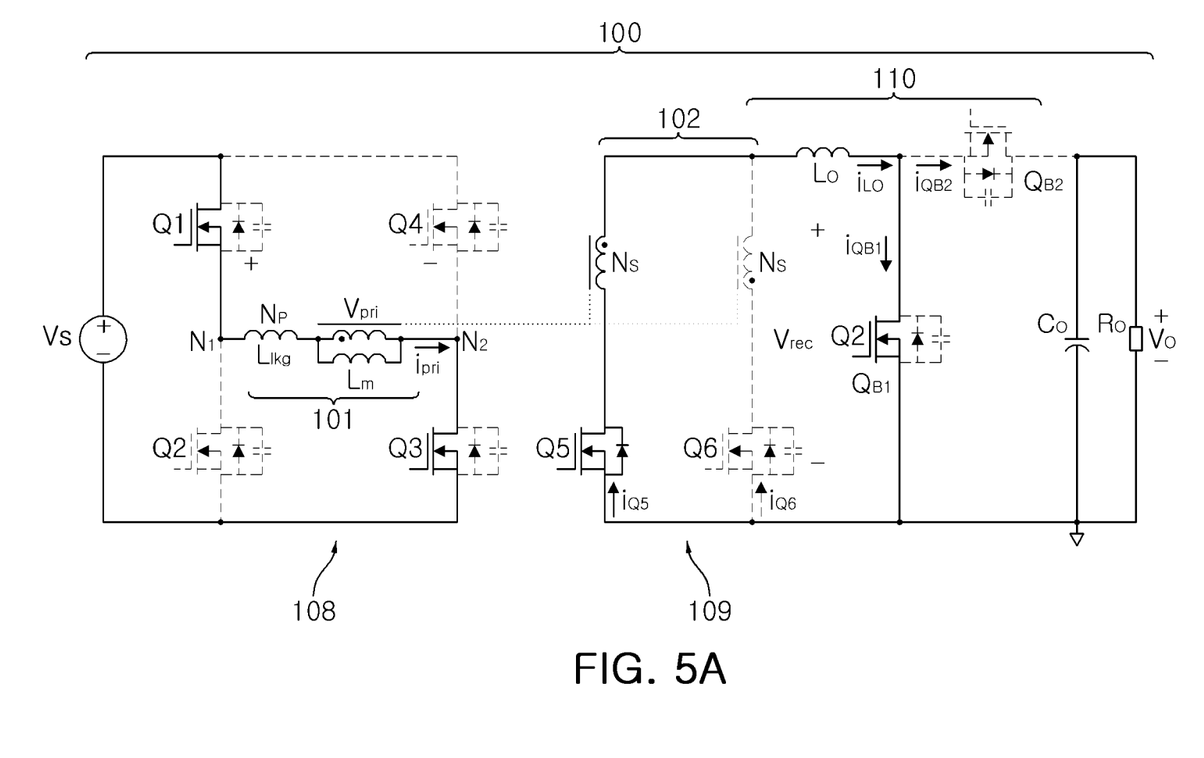
FIGS. 5A to 5D are circuit diagrams illustrating the operation of a circuit in a hold-up mode.

Since the first switching element $Q_1$ and the third switching element $Q_3$ are in the on state, a voltage $V_{pri}$ in the primary winding 101 of the main converter 100 is equal to that of a voltage source Vs. Therefore, a primary current $i_{pri}$ flowing through a path from the first switching element $Q_1$, to the primary winding 101 of the transformer, and to the third switching element $Q_3$ is increased at a constant gradient. Further, since the fifth switching element $Q_5$ is in the on state and the first sub switching element $Q_{B1}$ is in the on state, a voltage Vrec in the secondary winding 102 becomes a voltage of Vs/n according to a turns ratio (n:1), such that a current $i_{Lo}$ flowing into the inductor Lo is increased at a gradient of (Vs)/nLO.

Each of parasitic capacitors C2 and C4 of the second switching element $Q_2$ and the fourth switching element $Q_4$ is charged with the voltage of Vs. As described above, in the first period, the main power is powered from the primary circuit of the main converter 100 to the secondary circuit thereof. Further, in the first period, the first sub switching element $Q_{B1}$ is in the on-state, and thus the energy powered to the secondary circuit may be stored in the inductor Lo.

Other symbols $i_{Q5}$ and $i_{Q6}$ that are not described, respectively, denote a current flowing in the fifth switching element $Q_5$ and a current flowing in the sixth switching element $Q_6$.

2. Second Period t1 to t2—$Q_1/Q_3/Q_5/Q_{B2}$: ON, $Q_2/Q_4/Q_6/Q_{B1}$: OFF (see FIG. 5B)

Figure 5B:
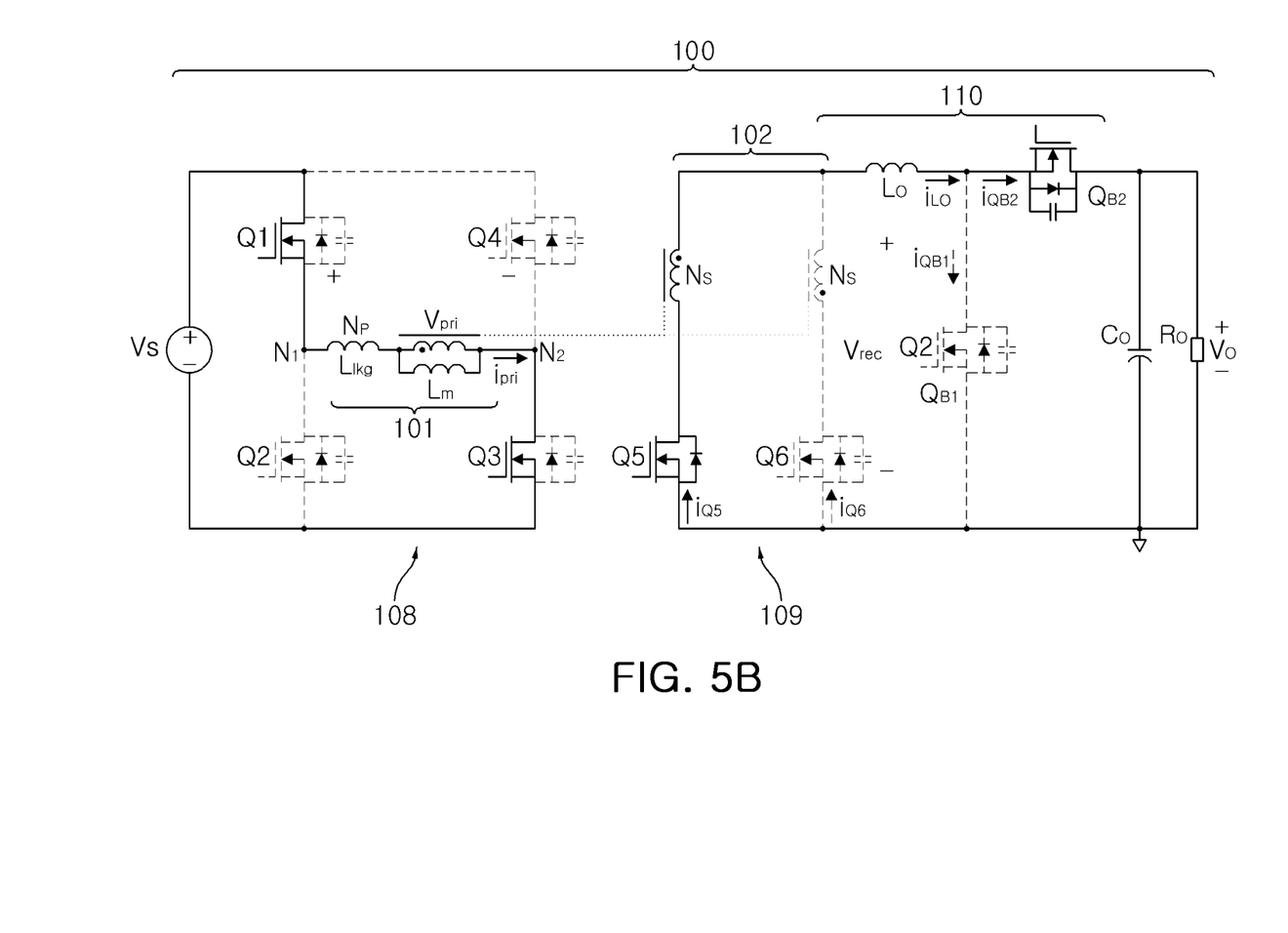

Like in the first period, in the second period, the main power is powered from the primary circuit of the main converter 100 to the secondary circuit thereof.

In the second period, however, the first sub switching element $Q_{B1}$ may be turned off and the second sub switching element $Q_{B2}$ may be turned on. Therefore, the energy stored in the inductor Lo may be delivered to the load.

3. Third Period t2 to t3—$Q_3/Q_5/Q_{B2}$: ON, $Q_1/Q_4/Q_{B1}$: OFF, $Q_2/Q_6$: Turned on (see FIG. 5C)

Figure 5C:
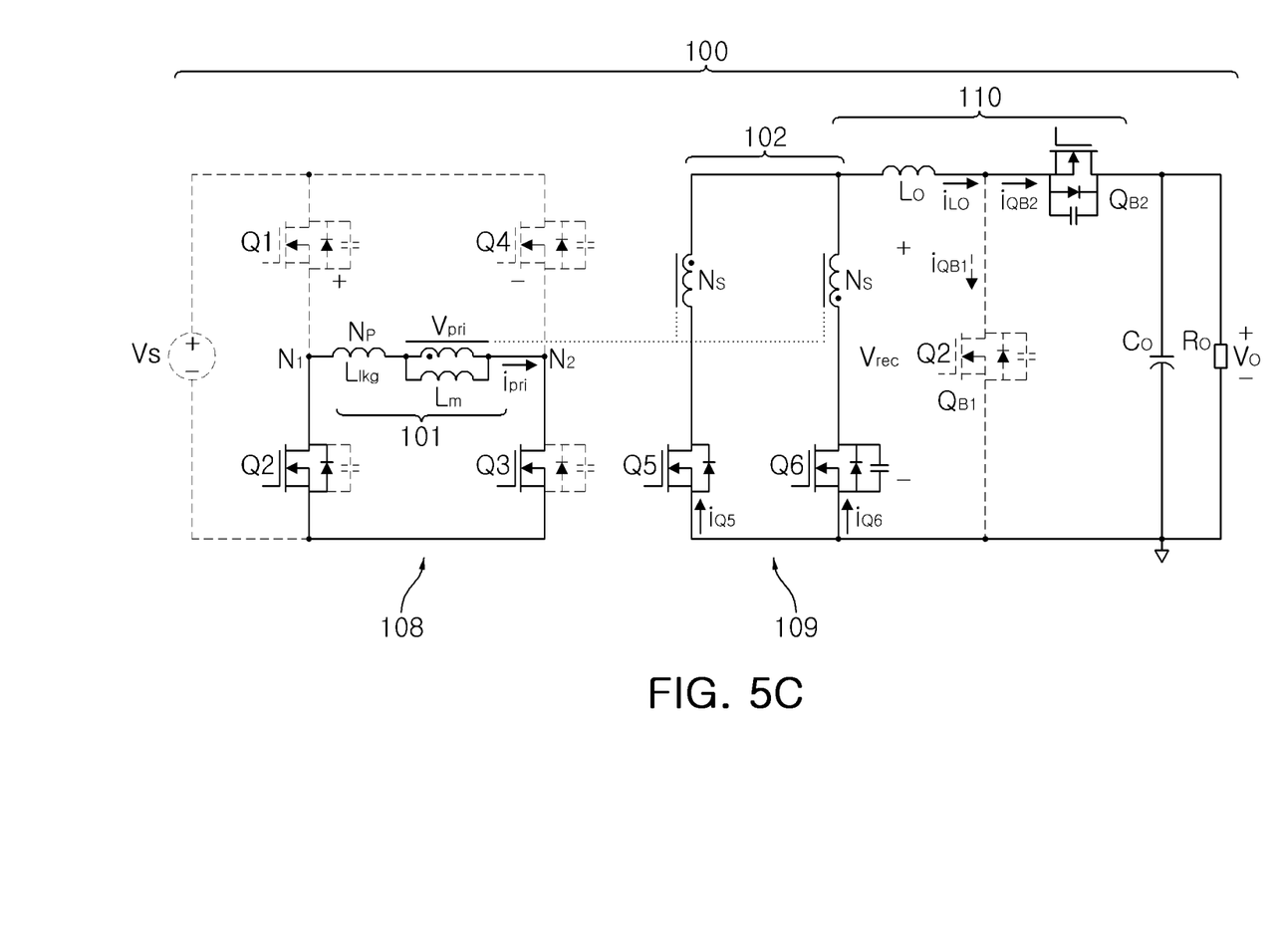

During this period, the second switching element $Q_2$ and the sixth switching element $Q_6$ are turned on. After the voltage charged in the parasitic capacitor C2 of the second switching element $Q_2$ in the first period is completely discharged, the second switching element $Q_2$ is turned on, such that the zero voltage switching may be performed for the second switching element $Q_2$.

The voltage $V_{pri}$, in the primary winding 101 of the main converter 100 is 0V, such that the primary current $i_{pri}$, flows through a path from the second switching element $Q_2$, to the primary winding 101 of the transformer, and to the third switching element $Q_3$. Since the voltage $V_{pri}$ in the primary wiring 101 of the main converter 100 is 0V, the voltage Vrec in the secondary winding 102 is also 0V.

Accordingly, the zero voltage switching of a sub switching element may be performed, and the current $i_{Lo}$ flowing in the inductor Lo of the main converter 100 flows through the fifth switching element $Q_5$, and the sixth switching element $Q_6$. Here, a gradient of the current $i_{Lo}$ is Vo/Lo.

4. Fourth Period t3 to t4—$Q_2/Q_6/Q_{B2}$: ON, $Q_1/Q_4/Q_{B1}$: OFF, $Q_3/Q_5$: Turned off (see FIG. 5D)

Figure 5D:
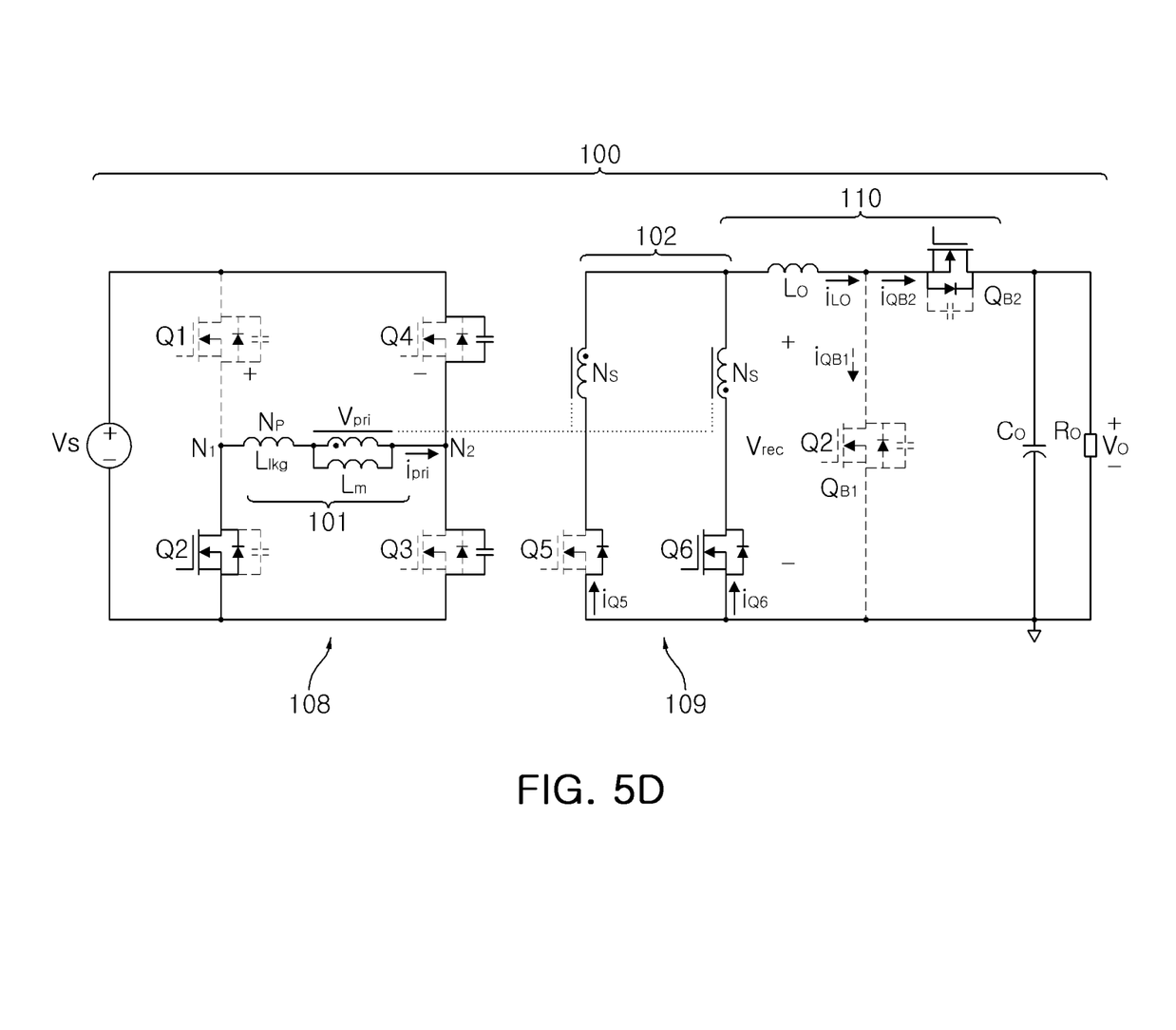

In this period, the third switching element $Q_3$ and the fifth switching element $Q_5$ are turned off. Since the third switching element $Q_3$ is turned off, the voltage charged in the fourth switching element $Q_4$ is completely discharged through a path from the voltage source Vs, to the second switching element $Q_2$, and to the primary winding 101 of the transformer, and the voltage $V_{pri}$ in the primary wiring 101 of the main converter 100 decreases from 0V to −Vs. As the voltage in the primary winding 101 of the transformer decreases from 0V to −Vs, the primary current $i_{pri}$ flowing in the primary winding 101 of the transformer is also reduced accordingly. In addition, since the fifth switching element $Q_5$ is turned off, the current, which was flowing through the channel of the fifth switching element $Q_5$, flows through the diode D5.

The sum of the current $i_{Q5}$ flowing through the diode D5 of the fifth switching element $Q_5$ and the current $i_{Q6}$ flowing through the body of the sixth switching element $Q_6$ is equal to the current $i_{Lo}$ flowing in the inductor Lo of the main converter 100. As shown, the voltage Vrec in the second winding 102 of the main converter 100 is 0V.

In FIG. 3, the symbol Ts denotes a period of time of one switching cycle. A DC conversion ratio of the power supply according to the present embodiment in the normal mode, may be expressed by equation 2.

$$\frac{V_O}{V_S} = \left(2D_{FB} \times \frac{N_S}{N_P}\right) \times \frac{D_B}{1 - D_B} \qquad [\text{Equation 2}]$$

Wherein the DFB denotes an effective duty ratio of a phase shifted full bridge DC to DC converter. And, wherein Vs denotes an input voltage, and Vo denotes an output voltage. Further, Np denotes a turns amount of the primary winding of a transformer, and Ns denotes turns amount of the secondary winding. In addition, DB denotes a duty ratio of the first sub switching element of the sub converter.

According to an embodiment of the present invention, the sub converter 110 included in the power supply may perform a boost function. The sub converter 110 may be operable during a hold-up period in which AC loss occurs, so that it may retain the output voltage.

Further, in a nominal mode, the sub converter 110 may retain the first sub switching element $Q_{B1}$ in an off state continually, while retaining the second sub switching element in an on state continuously, thereby minimizing additional loss.

Accordingly, the PSFB, according to the embodiment of the present invention, allows the duty ratio to be designed to have a relatively high value.

The embodiments of the present invention have been described with reference to the accompanying drawings. Although the embodiment of the present invention has been described in which the phase shifted DC to DC full-bridge converter is the main converter and the boost converter is the auxiliary converter, this is merely illustrative. It should be noted that various types of DC to DC converters other than the phase shifted DC to DC full-bridge converter and the boost converter may be used as the main converter and the auxiliary converter.

As set forth above, according to embodiments of the present invention, the efficiency of a power supply can be improved by controlling output voltage during a hold-up time.

While the present invention has been shown and described in connection with the embodiments, it will be apparent to those skilled in the art that modifications and variations can be made without departing from the spirit and scope of the invention as defined by the appended claims.

What is claimed is:

1. A power supply, comprising:
   a direct current (DC) to DC converter supplying main power to a load, the DC to DC converter and the load each having two terminals; and
   a sub converter connected to the DC to DC converter and reducing output loss wherein the sub-converter includes two sub switching elements which switch the main power from the DC to DC converter; and
   wherein one of the two sub switching elements is turned on in a predetermined nominal mode, and the two sub switching elements are periodically turned on and turned off in a predetermined hold up mode.

2. The power supply of claim 1, wherein the DC to DC converter includes:
   a primary circuit including a primary winding of a transformer; and
   a secondary circuit including a second winding magnetically coupled to the primary winding of the transformer.

3. The power supply of claim 2, wherein the primary circuit of the DC to DC converter includes a switching module in which two terminals, one terminal of a first switching element and one terminal of a second switching element connected in series, are connected to both terminals of a voltage source, and two terminals, one terminal of a third switching element and one terminal of a fourth switching element connected in series, are connected to the both terminals of the voltage source in parallel,
   wherein the primary winding of the transformer is connected between a first node and a second node, wherein the first switching element and the second switching element are connected at the first node, and the third switching element and the fourth switching element are connected at the second node.

4. The power supply of claim 3, wherein the secondary circuit of the DC to DC converter includes a switching element connected to the secondary winding of the transformer in series, and controlling current flowing in the secondary winding of the transformer.

5. The power supply of claim 2, wherein the sub converter includes:

an inductor element connected to the secondary circuit;
a first sub switching element providing a path for energy to be stored in the inductor element; and
a second sub switching element providing a path for delivering energy stored in the inductor element.

6. The power supply of claim 5, wherein the first sub switching element is turned on when the third switching element is turned on, and is turned off while the third switching element remains turned on.

7. The power supply of claim 6, wherein the second sub switching element is turned on after a predetermined period of time from when the first sub switching element is turned off, and is turned off when the third switching element is turned off.

8. The power supply of claim 5, wherein the first sub switching element is turned on when the fourth switching element is turned on, and is turned off while the fourth switching element remains turned on.

9. The power supply of claim 8, wherein the second sub switching element is turned on after a predetermined period of time from when the first sub switching element is turned off, and is turned off when the fourth switching element is turned off.

10. A power supply, comprising:
a DC to DC converter supplying main power through a primary circuit connected to terminals of a voltage source and a secondary circuit magnetically coupled to the primary circuit;
a sub converter storing energy supplied from the secondary circuit and providing a path for delivering the stored energy;
wherein the sub-converter includes two sub switching elements which switch the main power from the DC to DC converter; and
wherein one of the two sub switching elements is turned on in a predetermined nominal mode, and the two sub switching elements are periodically turned on and turned off in a predetermined hold up mode.

* * * * *